United States Patent
Sundaresan et al.

(10) Patent No.: US 7,421,611 B1
(45) Date of Patent: Sep. 2, 2008

(54) SCALING DYNAMIC CLOCK DISTRIBUTION FOR LARGE SERVICE PROVIDER NETWORKS

(75) Inventors: Krishna Sundaresan, Sunnyvale, CA (US); Chandrasekar Krishnamurthy, Sunnyvale, CA (US); Mahesh Chellappa, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/221,257

(22) Filed: Sep. 6, 2005

Related U.S. Application Data

(62) Division of application No. 10/059,555, filed on Jan. 28, 2002, now Pat. No. 6,957,358.

(51) Int. Cl.
*G06F 1/04* (2006.01)
(52) U.S. Cl. .................. 713/600; 713/400; 713/500
(58) Field of Classification Search ........... 713/400, 713/500, 600
See application file for complete search history.

(56) References Cited

U.S. PATENT DOCUMENTS

| | | | |
|---|---|---|---|
| 3,783,254 A | 1/1974 | Eichelberger |
| 3,908,084 A | 9/1975 | Wiley |
| 4,009,343 A | 2/1977 | Markey et al. |
| 4,009,344 A | 2/1977 | Flemming et al. |
| 4,009,345 A | 2/1977 | Flemming et al. |
| 4,009,346 A | 2/1977 | Parker et al. |
| 4,009,347 A | 2/1977 | Flemming et al. |
| 4,063,291 A | 12/1977 | Gennetten |
| 4,092,895 A | 6/1978 | Zabel |
| 4,663,769 A | 5/1987 | Krinock |
| 4,912,555 A | 3/1990 | Van Gestel |
| 5,151,904 A | 9/1992 | Reiner et al. |
| 5,163,068 A | 11/1992 | El-Amawy |
| 5,442,475 A | 8/1995 | Bausman et al. |
| 5,452,239 A | 9/1995 | Dai et al. |
| 5,473,271 A | 12/1995 | Little et al. |
| 5,475,830 A | 12/1995 | Chen et al. |
| 5,537,498 A | 7/1996 | Bausman et al. |
| 5,570,045 A | 10/1996 | Erdal et al. |
| 5,649,167 A | 7/1997 | Chen et al. |
| 5,684,808 A | 11/1997 | Valind |
| 5,686,845 A | 11/1997 | Erdal et al. |
| 5,719,862 A | 2/1998 | Lee et al. |
| 5,835,751 A | 11/1998 | Chen et al. |

(Continued)

OTHER PUBLICATIONS

Straub et al, "Method for Synchronization in a Communication Network and Implementing Appliances", WO 99/55028, Oct. 28, 1999.*

*Primary Examiner*—Nitin C. Patel
*Assistant Examiner*—Fahmida Rahman
(74) *Attorney, Agent, or Firm*—Blakely, Sokoloff, Taylor & Zafman LLP

(57) ABSTRACT

A system and method are disclosed for dividing a network into clock partitions to limit the overhead created by transmitting clock sources. A clock partition can be implemented through several methods. A first method turns off the clock topology exchange on ports connected to the nodes outside the partition. A second method appends a four-byte partition identifier to network clock distribution protocol (NCDP) messages. A third method uses private network-network interface (PNNI) peer group identification to determine the clock partition group.

18 Claims, 6 Drawing Sheets

U.S. PATENT DOCUMENTS

| | | |
|---|---|---|
| 5,873,053 A | 2/1999 | Pricer et al. |
| 5,963,728 A | 10/1999 | Hathaway et al. |
| 6,028,837 A | 2/2000 | Miller |
| 6,209,106 B1 | 3/2001 | Kubata et al. |
| 6,226,755 B1 | 5/2001 | Reeves |
| 6,240,000 B1 | 5/2001 | Sywyk et al. |
| 6,414,959 B1 * | 7/2002 | Asano .................. 370/395.62 |
| 6,556,936 B2 | 4/2003 | Gooding et al. |
| 6,591,370 B1 | 7/2003 | Lovett et al. |
| 6,654,917 B1 | 11/2003 | Floyd et al. |
| 6,957,358 B1 | 10/2005 | Sundaresan et al. |
| 7,124,071 B2 * | 10/2006 | Rich et al. .................... 703/16 |
| 2003/0208736 A1 | 11/2003 | Teng et al. |
| 2004/0057411 A1 * | 3/2004 | Straub et al. ................. 370/338 |
| 2004/0064799 A1 | 4/2004 | Reyes |
| 2004/0068599 A1 | 4/2004 | Blumrich et al. |
| 2004/0098241 A1 * | 5/2004 | Guettaf ........................ 703/19 |
| 2005/0229123 A1 * | 10/2005 | Wang et al. .................... 716/4 |

* cited by examiner

Prior Art

SCALING DYNAMIC CLOCK DISTRIBUTION FOR LARGE SERVICE PROVIDER NETWORKS

CROSS REFERENCE TO RELATED APPLICATION

The present application claims priority from and is a divisional application of U.S. patent application Ser. No. 10/059,555 filed Jan. 28, 2002 (issued as U.S. Pat. No. 6,957,358).

FIELD OF THE INVENTION

The field of the invention relates to clock distribution. More specifically, it relates to clock distribution in a large service provider network.

BACKGROUND OF THE INVENTION

Clock distribution helps nodes in the network latch on to the nearest available clock source. The clock source provides the nodes with clocking information. Nodes represent switching points, such as switches or routers, within a network. The clock information of individual nodes is propagated into the network through a network clock distribution protocol (NCDP). On receiving NCDP topology messages, each node computes the spanning tree to find the appropriate root for the clock source. The introduction of private network-node interface (PNNI) increases the number of nodes in the network exchanging clock information. When NCDP is run on all the nodes, the topology information to be processed on a single node is huge. The system also frequently exchanges topology clock information with other peer nodes causing performance degradation and clock degradation.

The NCDP is represented graphically by a NCDP spanning tree. One embodiment of a typical NCDP spanning tree is illustrated by the network of FIG. 1. A series of nodes 100 are connected together in a network. A few of the individual nodes 110 in the network are connected to a clock source 120. In some instances, a node 110 may be connected to more than one clock source 120. The nodes 110 read clock information from the clock source 120. Those nodes 110 attached to a clock source 120 transmit the clock information to the nodes 100 without a clock source 120. This clock information is transmitted through out the network.

SUMMARY OF THE INVENTION

A system and method are disclosed for dividing a network into clock partitions to limit the overhead created by transmitting clock sources. A clock partition can be implemented through several methods. A first method turns off the clock topology exchange on ports connected to the nodes outside the partition. A second method appends a four-byte partition identifier to network clock distribution protocol (NCDP) messages. A third method uses private network-network interface (PNNI) peer group identification to determine the clock partition group.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicated similar elements and in which.

DETAILED DESCRIPTION

A system and method are disclosed for dividing a network into clock partitions to limit the overhead created by transmitting clock sources. A clock partition can be implemented through several methods. A first method turns off the clock topology exchange on ports connected to the nodes outside the partition. A second method appends a four-byte partition identifier to network clock distribution protocol (NCDP) messages. A third method uses private network-network interface (PNNI) peer group identification to determine the clock partition group.

In order to enable the system to run NCDP based dynamic clock distribution in large networks, the network participating in NCDP exchange is divided into subsets of nodes. These subsets of nodes are referred to as clock partition. One or more clock sources are available within a clock partition. The nodes within a clock partition do not exchange clock topology information with nodes outside the clock partition. The clock partition can be implemented using a number of methods.

Figure 1:
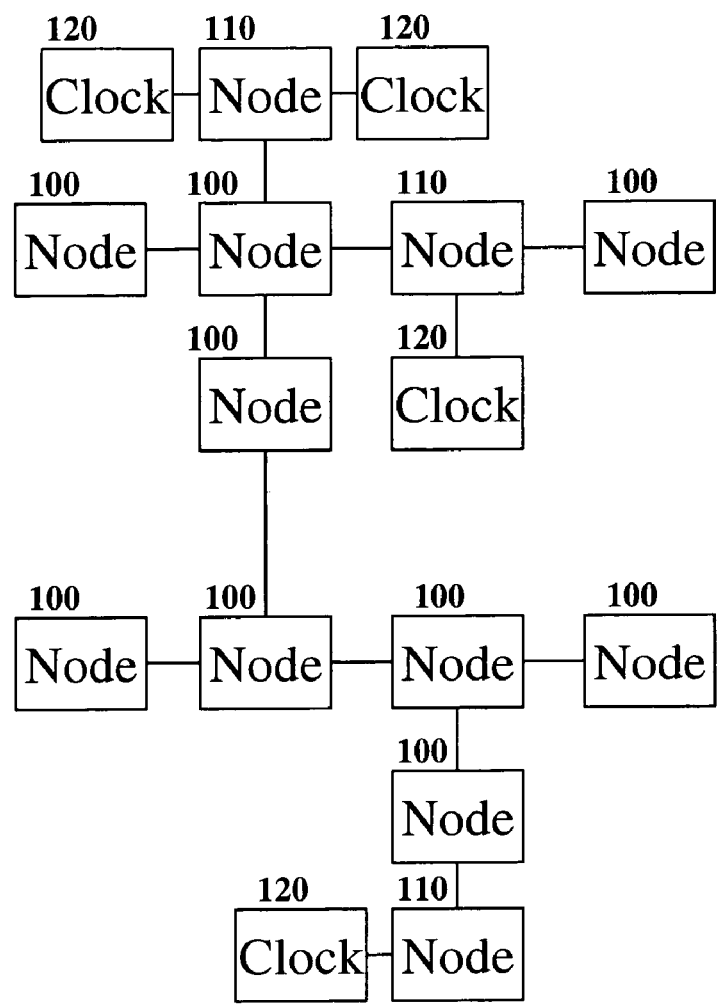
FIG. 1 is a block diagram illustrating a prior art network clock distribution protocol spanning tree.
Figure 2:
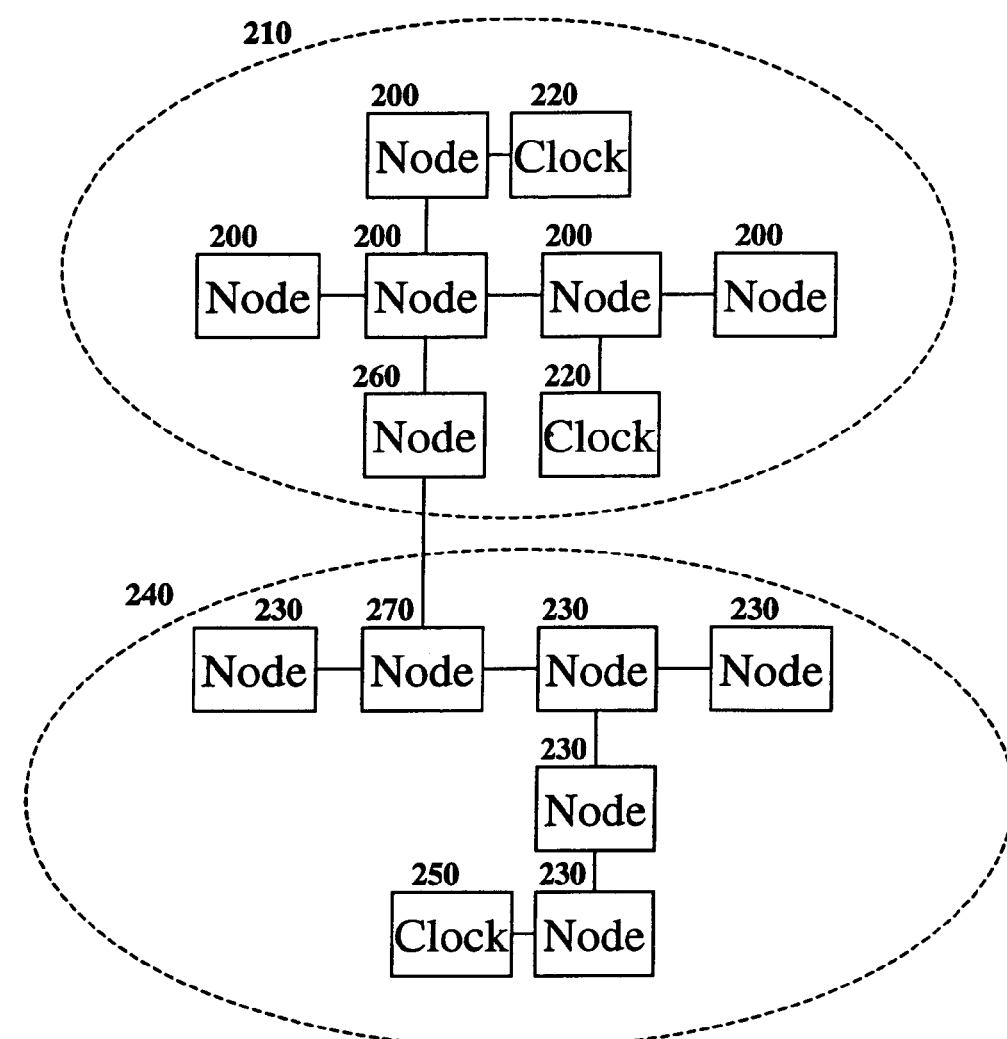
FIG. 2 is a block diagram illustrating a network clock distribution protocol spanning tree using clock partitions.

A network divided into clock partitions is illustrated in FIG. 2. A first set of nodes 200 is grouped into a first clock partition 210. The first clock partition 210 has one or more clock sources 220. A second set of nodes 230 is grouped into a second clock partition 240. The second clock partition 240 also has one or more clock sources 250. While a first node 260 from the first clock partition 210 is connected to a second node 270 from the second clock partition, no clock information is exchanged between the two nodes.

Figure 3:
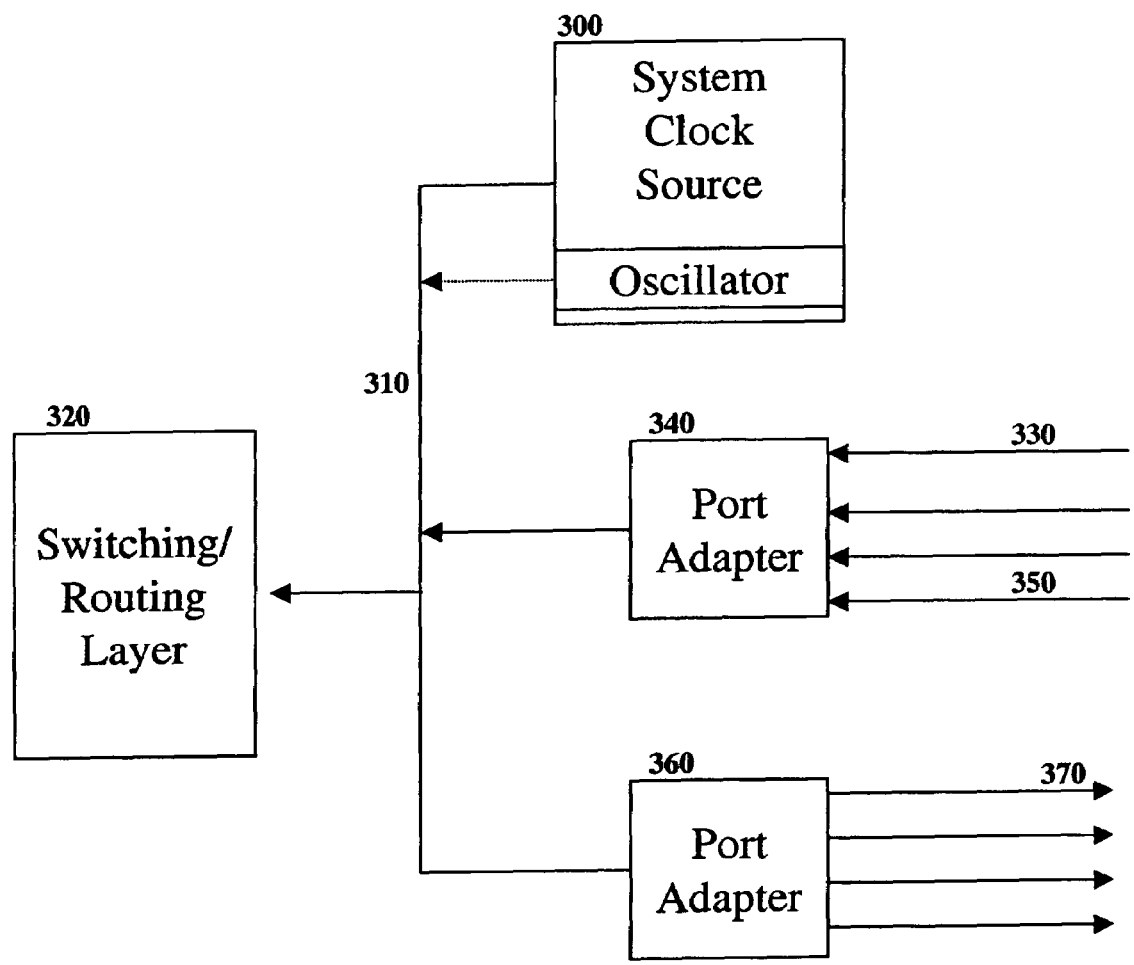
FIG. 3 is a block diagram illustrating a node network clock interface configured to create a clock partition.

In one embodiment, each node within a clock partition is capable of receiving the clock information from a variety of sources, as illustrated in FIG. 3. In one embodiment, an attached clock source 300 sends the clocking information via the backplane 310 to the switching or routing layer of the individual node 320. In an alternative embodiment, the clocking information is received from within the node's clock pain the and no clock source 300 is attached, or the attached clock source is a redundant clock source available in case of network failure. A clock source within the clock partition is designated as the primary clock source and sends primary clock information to the node via a first input clock topology exchange 330 of the input port adapter 340. In one embodiment, a secondary clock source sends secondary clock information via a second input clock topology exchange 350 of the input port adapter 340, to be used if the primary clock source fails. Several back up clock sources can be present within a clock partition. This clock information, whether received from an attached clock source or from a separate node within the clock partition, is propagated via the backplane 310 to the output port adapter 360. The output clock topology exchange 370 sends the clock information to those other nodes determined to be a part of the clock partition, and disregards those nodes not within the clock partition. In an alternative embodiment, the node determines at the input clock topology exchange whether the clock information received is from a node that is within the clock partition.

Figure 4:
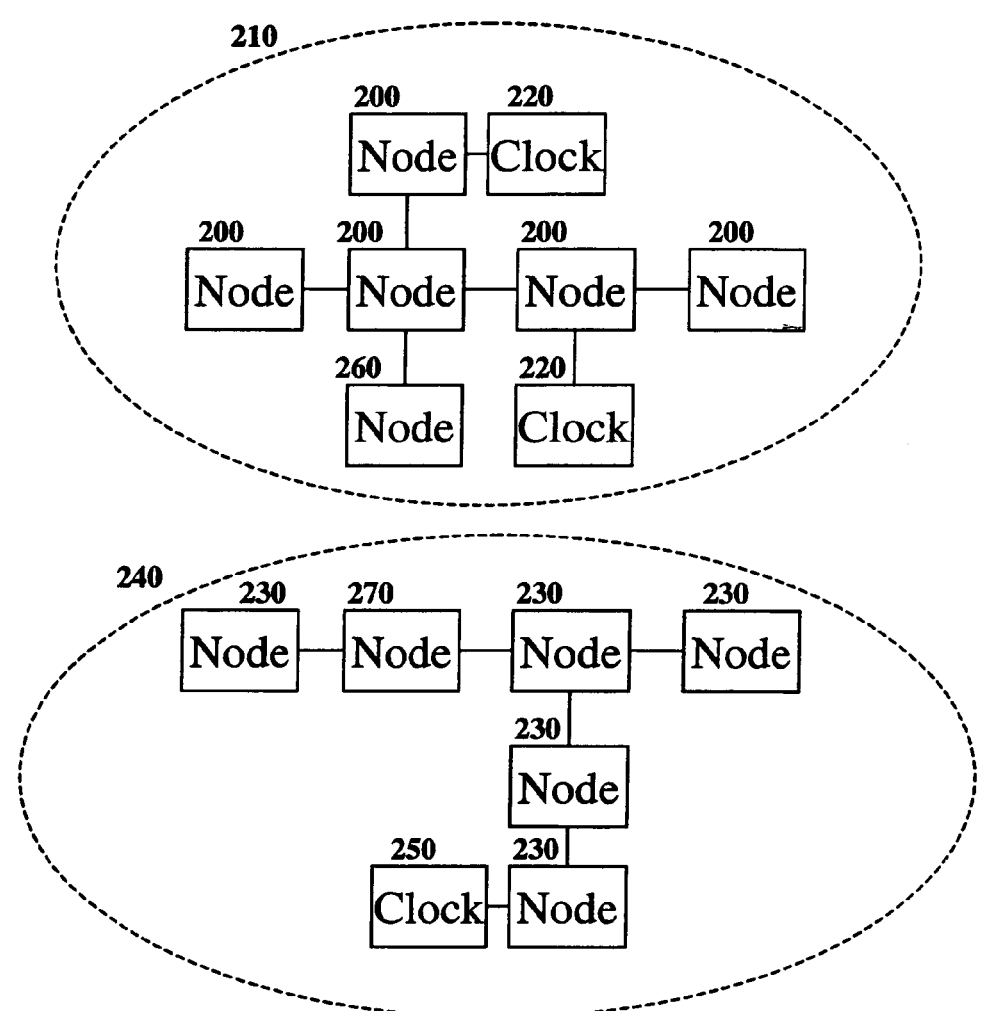
FIG. 4 is a block diagram illustrating a network clock distribution protocol spanning tree using a direct physical method of creating clock partitions.

Several methods exist for determining whether two nodes are part of the same clock partition or separate clock partitions, though other methods not described below are available as well. One method of implementing a clock partition is to administratively turn off clock topology exchanges on some of the ports in the network, creating the clock partition. A group of nodes within the clock partition will exchange NCDP clock information. The nodes outside the clock partition will not receive any NCDP clock information. This separation of clock partitions is illustrated in FIG. 4. Clock topology exchanges for the connection between the node 260 of the first partition 210 and the node 270 of the second partition 240 are disconnected.

A second method of implementing a clock partition is to add a partition identifier to the NCDP messages. In one embodiment the identifier is 4 bytes long. Each of the nodes will send NCDP configuration protocol data unit (PDU) messages to the peer nodes. The NCDP configuration PDU message contains a partition identifier. If the peer node has a partition identifier that matches the originating node's partition identifier, then the nodes exchange the NCDP topology information.

Figure 5:
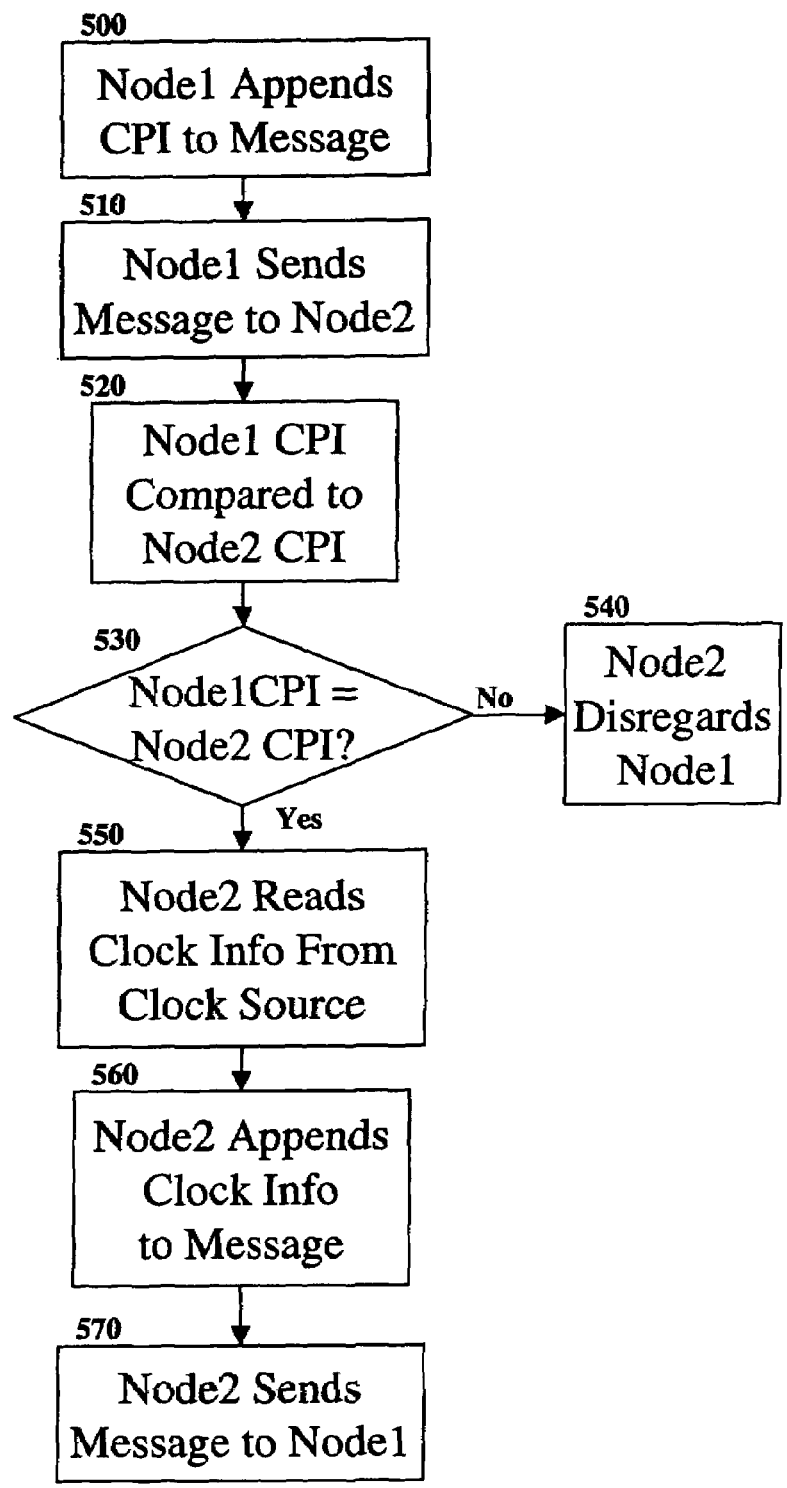
FIG. 5 is a flowchart of a method of using clock partition identifiers to create a clock partition.

The second method of implementing a clock partition is illustrated by the flow chart of FIG. 5. A first node (Node1) from the first clock partition appends a clock partition identifier (CPI) to a first message (Block 500). The first node sends the appended message to a second node (Node2) (Block 510). The CPI of the first node is compared to the CPI of the second node (Block 520). If the CPI of the first node is not the same as the CPI of the second node (Block 530), the second node is part of a different clock partition from the first node. The second node disregards the first node (Block 540). If the CPI of the first node is the same as the CPI of the second node (Block 530), both the first node and the second node are part of the same clock partition. The second node reads clock information from the clock source (Block 550). The second node appends the clock information to a second message (Block 560). The second node then sends the appended message to the first node (Block 570).

A third method of implementing a clock partition is to use the PNNI peer group identification (PPGI), if the network uses the PNNI protocol. The peer group identification of the lowest level peer group will be used as the clock partition identifier.

Figure 6:
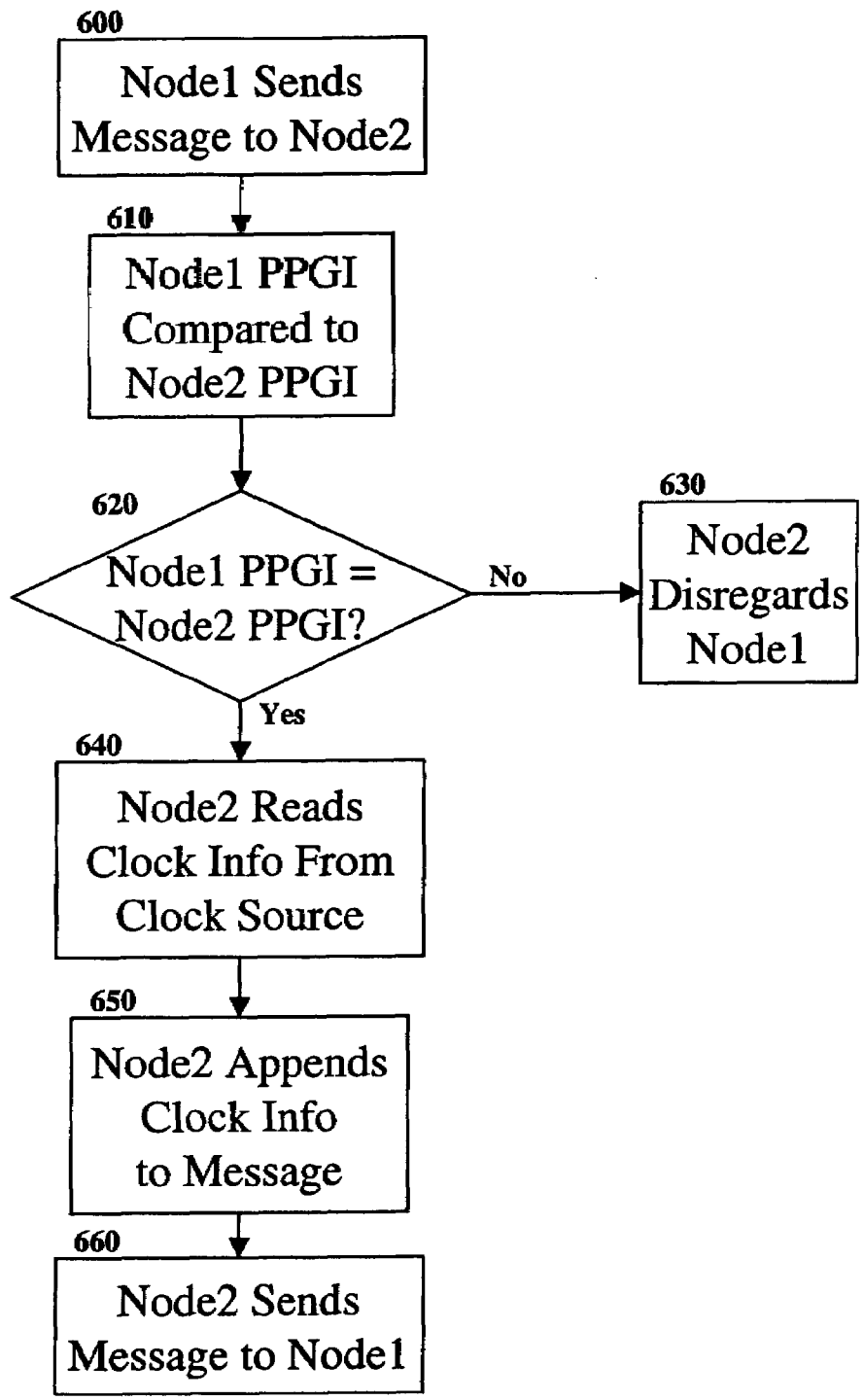
FIG. 6 is a flowchart of a method of using a private network-network interface (PNNI) peer group identification to create a clock partition.

The third method of implementing a clock partition is illustrated by the flow chart of FIG. 6. The first node (Node1) sends the appended message to a second node (Node2) (Block 600). The PPGI of the first node is compared to the PPGI of the second node (Block 610). If the PPGI of the first node is not the same as the PPGI of the second node (Block 620), the second node is part of a different clock partition from the first node. The second node disregards the first node (Block 630). If the PPGI of the first node is the same as the PPGI of the second node (Block 620), both the first node and the second node are part of the same clock partition. The second node reads clock information from the clock source (Block 640). The second node appends the clock information to a second message (Block 650). The second node then sends the appended message to the first node (Block 660).

The method described above can be stored in the memory of a computer system as a set of instructions to be executed. The instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented by additional computer and/or machine readable media, such as discrete hardware components as large-scale integrated circuits (LSI's), application-specific integrated circuits (ASIC's), firmware such as electrically erasable programmable read-only memory (EE-PROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method, comprising:
   partitioning a subset of nodes with each node including a router within a network of routers to create a clock partition, the clock partition comprising at least one clock source;
   sharing clock information from the at least one clock source with nodes within the clock partition and not sharing the information with nodes outside the clock partition;
   assigning a first clock partition identifier unique to the subset of nodes within the clock partition;
   appending the first clock partition identifier to a network clock distribution protocol (NCDP) message being sent from a first node to a second node; and
   disregarding the NCDP message sent from the first node if the first clock partition identifier of the first node does not match a second clock partition identifier of the second node with the second node being part of a different clock partition compared to the first node.

2. The method of claim 1, further comprising creating the clock partition by disconnecting clock topology exchange on a port in the network.

3. The method of claim 1, wherein the message is a configuration protocol data unit message.

4. The method of claim 1, further comprising:
   sending the clock information if a match exists between the first clock partition identifier of the first node and the second clock partition identifier of the second node with both the first node and second node being part of the clock partition.

5. The method of claim 1, further comprising using private network-node interface (PNNI) protocol.

6. The method of claim 1, further comprising basing the clock partition on a private network-node interface (PNNI) peer group identification.

7. The method of claim 1, wherein each router comprises a switch.

8. An apparatus, comprising:
   means for partitioning a subset of nodes with each node including a router within a network of routers to create a clock partition, the clock partition comprising at least one clock source;

means for sharing clock information from the at least one clock source with nodes within the clock partition and not sharing the information with nodes outside the clock partition;

means for assigning a first clock partition identifier unique to the subset of nodes within the clock partition;

means for appending the first clock partition identifier to a network clock distribution protocol (NCDP) message being sent from a first node to a second node; and means for disregarding the NCDP message sent from the first node if the first clock partition identifier of the first node does not match a second clock partition identifier of the second node with the second node being part of a different clock partition compared to the first node.

9. The apparatus of claim 8, further comprising means for providing multiple sources of clock information to a single clock partition.

10. The apparatus of claim 8, further comprising means for creating the clock partition by disconnecting clock topology exchange on a port in the network.

11. The apparatus of claim 8, wherein the message is a configuration protocol data unit message.

12. The apparatus of claim 8, further comprising:
means for sending the clock information if a match exists between the first clock partition identifier of the first node and the second clock partition identifier of the second node with both the first node and second node being part of the clock partition.

13. The apparatus of claim 8, further comprising means for using private network-node interface (PNNI) protocol.

14. The apparatus of claim 13, further comprising means for basing the clock partition on a PNNI peer group identification.

15. The apparatus of claim 8, wherein each router comprises a switch.

16. A method, comprising:
partitioning a subset of nodes with each node including a router within a network of routers to create a clock partition, the clock partition comprising at least one clock source; and sharing clock information from the at least one clock source with nodes within the clock partition and not sharing the information with nodes outside the clock partition;

assigning a clock partition identifier unique to the subset of nodes within the clock partition;

using private network-node interface (PNNI) protocol;

basing the clock partition on a PNNI peer group identification (PPGI);

appending the clock partition identifier to a first PNNI message being sent from a first node to a second node; and disregarding the first PNNI message sent from the first node if a PPGI of the first node does not match a PPGI of the second node with the second node being part of a different clock partition compared to the first node.

17. The method of claim 16, wherein each router comprises a switch.

18. The method of claim 16, further comprising:
appending clock partition information to a second PNNI message being sent from the second node to the first node if the PPGI of the first node matches the PPGI of the second node with the second node being part of the same clock partition compared to the first node.

* * * * *